UNITED STATES PATENT OFFICE.

MARY H. COLAHAN, OF CHICAGO, ILLINOIS.

PRODUCING A SOLVENT TO BE USED IN THE ARTIFICIAL RETTING OF BAST FIBROUS STALKS OR PLANTS.

No. 897,522.　　　　　Specification of Letters Patent.　　　　Patented Sept. 1, 1908.

Application filed September 21, 1907. Serial No. 393,978.

*To all whom it may concern:*

Be it known that I, MARY H. COLAHAN, a citizen of the United States, and resident of Chicago, county of Cook, and State of Illinois, have invented certain new and useful Improvements in Producing a Solvent to be Used in the Artificial Retting of Bast Fibrous Stalks or Plants, of which the following is a specification.

My invention consists of producing this fiber retting solvent fluid at very little expense, in concentrated form for convenience in handling the same by freight or otherwise and the invention has to do especially with the production of the solvent, that it may be effective in its use of decomposing and rendering soluble to a certain extent, the glutinous and intracellular substances, which cause the bast fibers to adhere to each other and to the woody part of the stalk. This operation, which is commonly called "retting", is one of the most important in the entire preparation of fibrous stalks, such as flax and hemp, as it influences the final product, as regards its tensile strength, durability and color; it is also conducive to the separation of the fibers from the stem, and the more perfect the "retting" is carried on, the better is the uniformity, fineness, and divisibility of the fiber-bundles. The present manner in general use of effecting this retting operation, or partial degumming of the bast fibers, is by exposure of the same on the field, to the weather, and this field retting is uncertain in its results, and liable to cause injury by overexposure, which damages the quality of the fiber, causing it to be weak and imperfect, so that when the fiber is submitted to the mechanical processes of braking and cleaning in its preparation for the use of the spinner, there is a large percentage of loss and waste, which cannot be controlled. The natural oily constituents of the fiber are also destroyed in the field retting, making it of inferior spinning quality.

By the use of my solvent, the time and conditions of retting are under perfect control, and there is no waste of the fiber in the final preparation for spinning, as it has all its tensile strength natural to it, and the oily constituents have not been disturbed, making a uniform-perfect fiber, and being thoroughly degummed, it is capable of being reduced and subdivided, to make as fine a filament as desired in spinning. The fiber, retaining its natural oils, is not affected by hydroscopic conditions.

The solvent used in my process above described, is obtained from the novel treating of what is termed "sludge" or "acid sludge" at oil refineries, this being a residuum in the refining of petroleum, and which is subjected to various processes for the reclaiming of the elements used therein. In the course of these processes, there is a liquid discharge drawn from the bottom of the tank, known as "acid oil". This liquid still retains part of the acid and other elements used in refining, together with a small proportion of the oil being treated, though nearly all have been reclaimed therefrom. I take this waste liquid, and neutralize it with caustic soda, gradually using in proportions from one fourth to one half pound soda to a barrel of liquid, or more if needed, the soda causing the liquid to effervesce and be agitated, thus forming a new compound that contains the necessary elements in concentrated form, that are effective in decomposing and solubilizing the gummy substances to a certain extent in the treatment of the fibrous stalks. This concentrated solvent can be shipped to points desired, thus saving a large expense in the matter of freight. At the time of using it as a fiber solvent, it is diluted with water from 30 to 80 percent., according to the kind of fiber to be treated, and is again blended and united by the action of injected steam, and in which heated solvent the unbroken stalks, as cured after harvest, are immersed from ten to thirty minutes, and the quick action of the solvent upon the fibrous stalks is most efficacious as it thoroughly degums the fiber and separates it from the stalks, which are not water-soaked when taken from the solvent. This result facilitates the quick drying of the fiber, when it is ready for decortication and the final finishing.

This improved solvent is adapted to all conditions of the bast fiber stalks, and can be applied without injury to the fiber, and leaves it in a condition so that it can be fiberized at the time, or stored for any length of time, as the treated stalk is not affected by the hydroscopic influences.

The energetic effect of this improved solvent is of great advantage, as it quickly softens and decomposes the adhering gums, and can be regulated to meet the requirements and different conditions and kinds of fiber at the time of its application so as to produce a soft or hard fiber as desired, by means of the steam heat that may be varied as it is admitted into the open tanks by pipes provided with valves, which control its action to increase or decrease the temperature, and a consequent result in solubilizing the gums without injury to the fiber. The fibrous stalks, when dry, and subjected to decortication, will produce a soft silky fiber, thoroughly cleaned and freed from the gums and woody substances, suitable for fine threads, or, the coarser hard fibers, used for cordage.

Having thus described my invention, what I claim and desire to procure by Letters Patent is;

1. In artificial retting of unbroken bast fibrous stalks, the subjecting of the same to the action of a solvent produced from the acid sludge discharge liquid, known as "acid oil", combined with a small percent. of soda, thus forming a new compound in concentrated form, for treating the stalks substantially as shown and described.

2. In artificial retting of fibrous stalks, the subjecting of the same to the action of a solvent produced from the acid sludge discharge liquid known as "acid oil," and a small per cent. of soda, combined with means for the injection of steam under control to regulate its action on the fiber in degumming and separating it from the woody part of the stalk, so that it is conditioned, when dry, for decortication to a perfect spinning fiber.

MARY H. COLAHAN.

Witnesses:
M. A. BEAN,
R. C. STOLL.